United States Patent [19]
Sandstrom et al.

[11] Patent Number: 5,901,766
[45] Date of Patent: May 11, 1999

[54] PNEUMATIC TIRE HAVING A TREAD COMPOUND CONTAINING HIGH LEVELS OF LOW TG POLYMER AND RESIN

[75] Inventors: Paul Harry Sandstrom, Tallmadge; Edward John Blok, Wadsworth; John Joseph Andre Verthe, Kent, all of Ohio

[73] Assignee: The Goodyear Tire & Rubber Company, Akron, Ohio

[21] Appl. No.: 08/920,109

[22] Filed: Aug. 26, 1997

[51] Int. Cl.$^6$ ................................ B60C 11/00; C08L 9/00
[52] U.S. Cl. ..................... 152/209 R; 524/270; 524/271; 524/272; 525/236; 525/237
[58] Field of Search ..................... 524/270, 271, 524/272; 525/236, 237; 152/209 R

[56] References Cited

U.S. PATENT DOCUMENTS

| 5,191,021 | 3/1993 | Halasa et al. | 525/237 |
| 5,300,577 | 4/1994 | Dirossi et al. | 525/237 |
| 5,504,140 | 4/1996 | Zanzig et al. | 524/526 |

OTHER PUBLICATIONS

Powers, Paul O, Rubber Chem & Technology, 36, 1542 (1963).

Product brochure for Koresin.

Product brochure for Wing–Tack® 95.

*Primary Examiner*—James J. Seidleck
*Assistant Examiner*—Olga Asinovsky
*Attorney, Agent, or Firm*—Bruce J. Hendricks

[57] ABSTRACT

The present invention relates to a pneumatic tire having a tread containing (a) from 50 to 90 phr (parts by weight of rubber per 100 total parts of rubber) of a rubber which, in its uncured state, has a glass transition temperature in the range of from −80° C. to −110° C. and (b) from 15 to 50 phr of a resin.

10 Claims, No Drawings

5,901,766

PNEUMATIC TIRE HAVING A TREAD COMPOUND CONTAINING HIGH LEVELS OF LOW TG POLYMER AND RESIN

BACKGROUND OF THE INVENTION

The present invention relates to a pneumatic tire having a tread which is composed of high levels of a low Tg polymer and resin. The tread composition exhibits improved lab properties which correlate to improved treadwear with concomitant improvements in traction and handling.

SUMMARY OF THE INVENTION

The present invention relates to a pneumatic tire having a tread containing (a) from 50 to 90 phr (parts by weight of rubber per 100 total parts of rubber) of a rubber which, in its uncured state, has a glass transition temperature in the range of from −80° C. to −110° C. and (b) from 15 to 50 phr of a resin.

DETAILED DESCRIPTION OF THE INVENTION

There is disclosed a pneumatic tire having an outer circumferential tread where said tread is a sulfur-cured composition comprising (a) 50 to 90 phr of a rubber which, in its uncured state, is characterized by having a glass transition temperature (Tg) in the range of from −80° C. to −110° C.;

(b) 10 to 50 phr of at least one rubber, each one of which, in its uncured state, is characterized by having a glass transition temperature in the range of from −79° C. to +20° C. and which is selected from the group consisting of natural rubber, synthetic cis 1,4 -polyisoprene, 3,4-polyisoprene, styrene/butadiene rubber, styrene/isoprene/butadiene terpolymer rubber, solution-polymerized polybutadiene rubber, emulsion-polymerized polybutadiene, isoprene/butadiene rubber and mixtures thereof; and (c) 15 to 50 phr of a resin selected from the group consisting of hydrocarbon resins, phenol/acetylene resins, rosin-derived resins and mixtures thereof.

The term "Tg" refers to the glass transition temperature of the identified rubber and is suitably determined by a differential scanning calorimeter at a rate of 10° C. per minute.

The tread is comprised of 50 to 90 parts by weight per 100 total parts by weight of rubber in the tread of a rubber which, in its uncured state, has a Tg in the range of from −80° C. to −110° C. Preferably, the Tg of this rubber ranges from about −90 to −105° C. As used herein, this rubber is known as a low Tg rubber. Preferably, the low Tg rubber is present in an amount ranging from 50 to 70 phr. This rubber may also be characterized by a butadiene content of at least 70 weight percent or greater. Should the butadiene content be substantially less than 70 weight percent, the Tg of the rubber will not be within the desired −80 to −110° C. Preferably, the butadiene content ranges from about 75 to 100 weight percent. A representative rubber is a polybutadiene rubber having 95 weight percent or more cis 1,4-structure, a Tg of from 95 to −105° C. and a Mooney viscosity (ML 1+4) at 100° C. of from 30 to 100. Another example of a suitable rubber is an isoprene/butadiene copolymer rubber prepared by neodymium catalysis and characterized by having an isoprene content of about 20 weight percent, a Tg of about −90° C. and a Mooney viscosity (ML 1+4) at 100° C. of 82. Yet another example is an isoprene/butadiene copolymer rubber prepared by neodymium catalysis and characterized by having an isoprene content of about 10 weight percent, a Tg of about −98° C. and a Mooney viscosity (ML 1+4) at 100° C. of 82. Other examples of suitable rubbers are solution-polymerized styrene/butadiene copolymer rubbers containing up to 10 weight percent of styrene. Such styrene/butadiene copolymers exhibit a Tg of from −93° C. to −80° C. and Mooney viscosities (ML 1+4) at 100° C. from 30 to 100. The preferred rubber is the above-described cis-1,4-polybutadiene.

In addition to the low Tg rubber, the tread also contains from 10 to 50 phr of at least one rubber which, in its uncured state, has a Tg of from −79° C. to +20° C. Preferably, from 30 to 50 phr of the total rubber in the tread is a rubber having a Tg of from −79° C. to +20° C. The preferred Tg range for this rubber ranges from −50 to +10° C. The rubbers in this broad range of Tgs can be further classified as "medium Tg" rubber and "high Tg" rubber. Medium Tg rubbers are those rubbers, in their uncured state, which have a Tg ranging from −79° C. to −50° C. High Tg rubbers are those rubbers having a Tg ranging from −49° C. to +20° C.

Representative examples of medium Tg rubbers include cis 1,4-polyisoprene. The cis 1,4-polyisoprene rubber includes both natural and synthetic rubbers. The cis 1,4-polyisoprene rubber, natural or synthetic, typically has a cis 1,4-content of about 96 to about 99 weight percent. Synthetic cis 1,4-polyisoprene generally has a Tg of about −65° C. Natural rubber typically has a Tg of about −65° C. Typical Mooney viscosities (ML 1+4) at 100° C. for synthetic cis 1,4-polyisoprene and natural rubber range from 30 to 100. Another medium Tg rubber is an isoprene/butadiene copolymer rubber prepared by neodymium catalysis characterized by an isoprene content of about 70 weight percent, a Tg of about −79° C. and a Mooney viscosity (ML 1+4) at 100° C. of 76. Another medium Tg rubber is solution-polymerized styrene/butadiene copolymer rubber having a styrene content of about 18 weight percent, a vinyl content of about 10 weight percent, a Tg of about −78° C. and a Mooney viscosity (ML 1+4) at 100° C. of 85. Another example of a medium Tg rubber is a solution-polymerized polybutadiene having a vinyl content of about 45 weight percent, a Tg of about −55° C. and a Mooney viscosity (ML 1+4) at 100° C. of 60. Yet another example of a medium Tg rubber is a solution-polymerized trans 1,4-polybutadiene having a weight percent content of 1,4-bonds ranging from about 60 to 80 weight percent, a Tg of about −70° C. and a Mooney viscosity (ML 1+4) at 100° C. of 60.

Representative examples of high Tg rubbers include 3,4 polyisoprene which typically contains about 65 weight percent 3,4-isoprene units and has a Tg of about −16° C. Another example of a high Tg rubber is a solution-polymerized styrene/butadiene copolymer rubber containing 12 weight percent styrene, a vinyl content of about 40 weight percent, a Tg of 45° C. and a Mooney viscosity (ML 1+4) at 100° C. of 90. Another high Tg rubber is a styrene/isoprene/butadiene terpolymer rubber containing 20 weight percent styrene, 40 weight percent isoprene and 40 percent butadiene, a Tg of −42° C. and a Mooney viscosity at 100° C. of 90. Yet another high Tg rubber is an emulsion-polymerized polybutadiene rubber characterized by the weight percent of 1,4-bonds ranging from 65 to 70 percent, 15 to 20 weight percent of the units of a vinyl 1,2-structure and 8 to 15 weight percent of its units of a cis 1,4-structure. Such emulsion-polymerized polybutadiene has a Tg of −65° C. and Mooney viscosity (ML 1+4) at 100° C. of about 65.

Additional examples of high Tg rubbers are emulsion-polymerized styrene/butadiene copolymer rubbers characterized by a weight percent of from 23.5 to 40 weight percent styrene. For example, an emulsion-polymerized styrene/butadiene copolymer rubber having 23.5 weight percent styrene typically has a Tg of about −55° C. and a Mooney viscosity (ML 1+4) at 100° C. of about 50. An emulsion-polymerized styrene/butadiene copolymer rubber having 40 weight percent styrene typically has a Tg of about −35° C. and a Mooney viscosity (ML 1+4) at 100° C. of about 50.

The tire of the present invention is comprised of a tread compound containing from 15 to 50 phr of a resin selected from the group consisting of hydrocarbon resins, phenol/acetylene resins, rosinderived resins and mixtures thereof. Preferably, the rubber contains from 15 to 30 phr of the resin.

Representative hydrocarbon resins include coumarone-indene-resins, petroleum resins, terpene polymers and mixtures thereof.

Coumarone-indene resins are commercially available in many forms with melting points ranging from 10° C. to 160° C. (as measured by the ball-and-ring method). Preferably, the melting point ranges from 30 to 100° C. Coumarone-indene resins are well known. Various analysis indicate that such resins are largely polyindene; however, typically contain random polymeric units derived from methyl indene, coumarone, methyl coumarone, styrene and methyl styrene. Representative examples of commercially available coumarone-indene resins are those marketed under the designation CUMAR® from Nalochem. These resins have a number of designations, some of which are listed below:

| Resin | Softening Point ° C. | Specific Gravity @ 25° C. | Molecular Weight No. Average |
|---|---|---|---|
| R-3 | 130 | 1.13 | 515 |
| LX-509 | 157 | 1.14 | 700 |
| R-11 | 112 | 1.09 | 700 |
| R-13 | 105 | 1.12 | 460 |
| R-17 | 70 | 1.10 | 500 |
| R-21 | 45 | 1.05 | 450 |
| R-29 | 25 | 1.08 | 420 |

The softening point was determined by ASTM E-28. The specific gravity was determined by ASTM D-71. The molecular weight number average was determined by ASTM D-3536.

Petroleum resins are commercially available with softening points ranging from 10° C. to 120° C. Preferably, the softening point ranges from 30 to 100° C. Suitable petroleum resins include both aromatic and nonaromatic types. Several types of petroleum resins are available. Some resins have a low degree of unsaturation and high aromatic content, whereas some are highly unsaturated and yet some contain no aromatic structure at all. Differences in the resins are largely due to the olefins in the feedstock from which the resins are derived. Conventional derivatives in such resins include dicyclopentadiene, cyclopentadiene, their dimers and diolefins such as isoprene and piperylene. A representative example of such a petroleum resin is Wingtack 95, which is commercially available from The Goodyear Tire & Rubber Company.

Terpene polymers are commercially produced from polymerizing a mixture of beta pinene in mineral spirits. The resin is usually supplied in a variety of melting points ranging from 10° C. to 135° C. Commercially available terpene polymers are available from Glidden under the designation CMP-361 and Schenectady Chem Co under the designation SP-560.

Phenol/acetylene resins may be used. Phenol/acetylene resins may be derived by the addition of acetylene to butyl phenol in the presence of zinc naphthlate. Additional examples are derived from alkylphenol and acetylene. A representative example of the latter is a resin that is commercially available from GAF of New York, N.Y., under the designation KORESIN™. This particular resin has a melting point of from 110° C. to 130° C.

Resins derived from rosin and derivatives may be used in the present invention. Gum and wood rosin have much the same composition, although the amount of the various isomers may vary. They typically contain about 10 percent by weight neutral materials, 53 percent by weight resin acids containing two double bonds, 13 percent by weight of resin acids containing one double bond, 16 percent by weight of completely saturated resin acids and 2 percent of dehydroabietic acid which contains an aromatic ring but no unsaturation. There are also present about 6 percent of oxidized acids. Representative of the diunsaturated acids include abietic acid, levopimaric acid and neoabietic acid. Representative of the monounsaturated acids include dextroplmaris acid and dihydroabietic acid. A representative saturated rosin acid is tetrahydroabietic acid. A commercially available rosin-derived resin is sold under the designation Westvaco Resin-90 from Westvaco Chemical Co.

The term "phr" as used herein, and according to conventional practice, refers to "parts by weight of a respective material per 100 parts by weight of total rubber or elastomer in the compound."

The pneumatic tire of the present invention may contain a siliceous filler. The siliceous fillers or pigments include pyrogenic and precipitated silica. The siliceous pigments are preferably precipitated silicas such as, for example, those obtained by the acidification of a soluble silicate, e.g., sodium silicate.

The silica filler, if used, may be added in amounts ranging from 10 to 250 phr. Preferably, the silica is present in an amount ranging from 15 to 80 phr.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutyl phthalate (DBP) absorption value in a range of about 100 to about 400, and more usually about 150 to about 300.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3, etc. The PPG Hi-Sil silicas are currently preferred.

If silica is optionally added to the compound, one may add silica coupling agents to promote the adhesion between the rubber and silica. Representative coupling agents include organosilanes such as 3,3' bis(triethoxysilylpropyl) tetrasulfide. Silica coupling agents are generally used in amounts ranging from 0.1 to 20 phr. Specific examples of such organosilanes are disclosed in U.S. Pat. No. 4,128,438 incorporated by reference in its entirety.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing oils, fillers, pigments, fatty acid, zinc oxide, waxes, antioxidants and antiozonants, peptizing agents and reinforcing materials such as, for example, carbon black. As known to those skilled in the art, depending on the particular properties of the tire tread, the additives mentioned above are selected and commonly used in conventional amounts.

Typical amounts of reinforcing type carbon blacks(s), range from 0 to 200 phr. Preferably, the carbon black level ranges from 5 to 125 phr. Representative of the conventional carbon blacks which may be used in the present invention include those known to those skilled in the art under the ASTM designations N110, N121, N205, N220, N231, N234, N242, N293, N299, S315, N326, N330, M332, N339, N343, N347, N351, N358 and N375. Typical amounts of processing oils comprise about 1 to 50 phr. Such processing oils include aromatic, napthenic and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from 2 to 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

Vulcanization of the rubber composition of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air or in a salt bath.

The mixing of the rubber composition can be accomplished by methods known to those having skill in the rubber mixing art. For example the ingredients are typically mixed in at least two stages, namely at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber, resins, silica and silica coupler, and carbon black if used, are mixed in one or more non-productive mix stages. The terms "non-productive" and "productive" mix stages are well known to those having skill in the rubber mixing art.

When large amounts of silica (over 20 phr) are used in conjunction with coupling agents, extended mix times significantly improve physical properties. Preferably, the mechanical mixing is under conditions sufficient to generate a rubber temperature between 130° C. and 180° C. for a period of time ranging from 10 seconds to 20 minutes.

The rubber compound as described herein is particularly suited for a tread of a pneumatic tire. Such tires can be built, shaped, molded and cured by various methods which are known and will be readily apparent to those having skill in such art. As can be appreciated, the tire may be a passenger tire, aircraft tire, truck tire and the like. Preferably, the tire is a passenger tire. The tire may also be a radial or bias, with a radial tire being preferred.

The invention may be better understood by reference to the following examples in which the parts and percentages are by weight unless otherwise indicated.

The following examples are presented in order to illustrate but not limit the present invention.

Cure properties were determined using a Monsanto oscillating disc rheometer which was operated at a temperature of 150° C. and at a frequency of 11 hertz. A description of oscillating disc rheometers can be found in the Vanderbilt Rubber Handbook edited by Robert O. Ohm (Norwalk, Conn., R. T. Vanderbilt Company, Inc., 1990), pages 554–557. The use of this cure meter and standardized values read from the curve are specified in ASTM D-2084. A typical cure curve obtained on an oscillating disc rheometer is shown on page 555 of the 1990 edition of the Vanderbilt Rubber Handbook.

In such an oscillating disc rheometer, compounded rubber samples are subjected to an oscillating shearing action of constant amplitude. The torque of the oscillating disc embedded in the stock that is being tested that is required to oscillate the rotor at the vulcanization temperature is measured. The values obtained using this cure test are very significant since changes in the rubber or the compounding recipe are very readily detected. It is obvious that it is normally advantageous to have a fast cure rate.

The following tables report cure properties that were determined from cure curves that were obtained from the rubber stocks that were prepared. These properties include a torque minimum (Min. Torque), a torque maximum (Max. Torque), minutes to 90% of the torque increase (T90) and difference between the maximum torque and minimum torque (delta torque).

Shore Hardness was determined in accordance with ASTM D-1415.

While certain representative embodiments and details have been shown for the purpose of illustrating the invention, it will be apparent to those skilled in this art that various changes and modifications may be made therein without departing from the spirit or scope of the invention.

EXAMPLE 1

Rubber compounds containing the materials set out in Table I were prepared in a BR Banburym mixer. Each sample contained the same level of each ingredient unless listed in the Tables. All samples were mixed in the same standard manner. The samples were cured at about 150° C. for about 18 minutes. Table II illustrates the behavior and physical properties of each of the cured samples.

TABLE I

Compound Ingredients

| Ingredients | phr |
|---|---|
| Nonproductive | |
| E-SBR[1] | Varied |
| Polybutadiene[2] | Varied |
| Coumarone Indene Resin[3] | Varied |
| Phenol/Acetylene Resin[4] | Varied |
| Processing Oil[5] | Varied |
| Carbon Black[6] | 70 |
| Processing Aids[7] | 3.25 |
| Fatty Acid | 2 |
| Zinc Oxide | 2 |
| Productive | |
| Amine Antioxidant | 1.15 |
| Sulfenamide Accelerators | 1.55 |
| Sulfur | 1.45 |

TABLE II

Compound Vulcanizate Properties

| Samples | Control 1 | Control 2 | Control 3 |
|---|---|---|---|
| E-SBR[1] | 70 | 50 | 30 |
| Polybutadiene[2] | 30 | 50 | 70 |
| Coumarone Indene Resin | 0 | 0 | 0 |
| Phenol Acetylene Resin | 0 | 0 | 0 |
| Processing Oil | 43.75 | 43.75 | 43.75 |
| Max Torque (dNm) | 28.0 | 31.5 | 30.7 |
| Min Torque (dNm) | 6.0 | 6.0 | 6.1 |
| Delta Torque (dNm) | 22.0 | 25.0 | 24.6 |
| T90 (min) | 15.5 | 13.8 | 12.8 |
| Stress-Strain, 18 min/150° C. Modulus (MPa) | | | |
| 100% | 1.3 | 1.4 | 1.4 |
| 300% | 5.2 | 5.7 | 5.2 |
| Brk Str (Mpa) | 18.1 | 16.0 | 14.5 |
| EL-Brk (%) | 715 | 630 | 628 |
| Hardness | 58 | 61 | 60 |
| (Room Temp) | | | |
| (100° C.) | 46 | 50 | 49 |
| Rebound | 33 | 35 | 37 |
| (Room Temp) | | | |
| (100° C.) | 48 | 51 | 50 |
| DIN Abrasion, cc | 106 | 86 | 71 |
| Dynamic Mechanical Properties, 11 Hz | | | |
| tan delta, 0° C. | .172 | .156 | .148 |
| E', 0° C. | 33.2 | 31.8 | 33.6 |
| E', 60° C. | 13.3 | 13.9 | 15.2 |
| tan delta, 60° C. | .146 | .134 | .133 |

| Samples | 4 | 5 | 6 | 7 |
|---|---|---|---|---|
| E-SBR[1] | 50 | 50 | 30 | 30 |
| Polybutadiene[2] | 50 | 50 | 70 | 70 |
| Coumarone Indene Resin[3] | 7.5 | 15 | 7.5 | 15 |
| Phenol/Acetylene Resin[4] | 7.5 | 0 | 7.5 | 0 |
| Processing Oil[5] | 31.25 | 31.25 | 28.75 | 28.75 |
| Max Torque (dNm) | 28.4 | 29.7 | 32.6 | 32.8 |
| Min Torque (dNm) | 5.6 | 6.0 | 6.5 | 7.0 |
| Delta Torque (dNm) | 22.8 | 23.7 | 26.1 | 25.8 |
| T90 (min) | 14.0 | 15.0 | 13.0 | 13.5 |
| Stress-Strain, 18 min/150° C. Modulus (MPa) | | | | |
| 100% | 1.3 | 1.3 | 1.3 | 1.4 |
| 300% | 4.8 | 5.0 | 5.0 | 5.1 |
| Brk Str (Mpa) | 17.7 | 17.1 | 16.3 | 16.7 |
| EL-Brk (%) | 738 | 716 | 693 | 705 |
| Hardness | 61 | 61 | 60 | 62 |
| (Room Temp) | | | | |
| (100° C.) | 48 | 48 | 50 | 51 |
| Rebound | 31 | 31 | 32 | 33 |
| (Room Temp) | | | | |
| (100° C.) | 46 | 45 | 47 | 46 |
| DIN Abrasion, cc | 97 | 96 | 78 | 73 |
| Dynamic Mechanical Properties, 11 Hz | | | | |
| tan delta, 0° C. | .170 | .160 | .162 | .152 |
| E', 0° C. | 43.6 | 43.2 | 35.4 | 41.7 |
| E', 60° C. | 18.2 | 18.2 | 16.0 | 20.4 |
| tan delta, 60° C. | .178 | .156 | .160 | .145 |

[1]An emulsion polymerized styrene/butadiene rubber containing 23.5 percent by weight bound styrene, Tg = –55° C., ML1 + 4 (100° C.) = 50, containing 37.5 phr of oil and commercially available from The Goodyear Tire & Rubber Company under the designation Pliolite ® 1712.
[2]A polybutadiene rubber containing 98 percent by weight cis 1,4-units, Tg = –103° C., ML1 + 4 (100° C.) = 50, containing 25 phr oil and commercially available from The Goodyear Tire & Rubber Company under the designation Budene ® 1254.
[3]Coumarone-Indene resin commercially available from Nalochem under the designation CUMAR ® R-16.
[4]Phenol/acetylene resin commercially available from GAF under the tradename KORESIN ™.
[5]Aromatic type
[6]N220
[7]Waxes and peptizer The DIN abrasion results suggest significant improvements in treadwear for the compounds containing the higher levels of polybutadiene and resins. Wet traction, which is related to the low temperature dynamic properties (tan delta at 0° C.), is improved for the compounds containing the high level of resins. The high levels of the above polybutadiene combined with the high levels of resin improves the conventional tradeoff between treadwear and traction.

What is claimed is:

1. A pneumatic tire having an outer circumferential tread where said tread is a sulfur-cured composition comprising
(a) 50 to 90 phr of a rubber which, in its uncured state, has a glass transition temperature (Tg) in the range of from –80° C. to –110° C.;
(b) 10 to 50 phr of at least one rubber which, in its uncured state, has a glass transition temperature (Tg) in the range of from −79° C. to +20° C. and which is selected from the group consisting of cis 1,4-polyisoprene, 3,4 polyisoprene, styrene/butadiene rubber, styrene/isoprene/butadiene terpolymer rubber, solution-polymerized polybutadiene rubber, emulsion-polymerized polybutadiene, isoprene/butadiene rubber and mixtures thereof; and (c) 15 to 50 phr of a resin selected from the group consisting of hydrocarbon resins, phenol/acetylene resins, rosin-derived resins and mixtures thereof.

2. The pneumatic tire of claim 1 wherein said rubber characterized by a glass transition temperature ranging from −80° C. to −110° C. is selected from the group consisting of cis 1,4-polybutadiene, an isoprene/butadiene copolymer, solution-polymerized styrene/butadiene copolymer and mixtures thereof.

3. The pneumatic tire of claim 1 wherein said composition comprises (a) 50 to 70 phr of a rubber having a glass transition temperature in the range of from −80 to −110° C. and (b) 30 to 50 phr of rubber having a glass transition temperature in the range of from −79 to +20° C. and is selected from the group consisting of natural rubber, synthetic cis 1,4-polyisoprene, 3,4-polyisoprene, styrene/butadiene rubber, styrene/isoprene/butadiene terpolymer rubber, high trans 1,4-polybutadiene rubber, styrene/isoprene rubber, isoprene/butadiene rubber and mixtures thereof.

4. The pneumatic tire of claim 1 wherein said hydrocarbon resins are selected from the group consisting of coumarone-indene resins, petroleum resins, terpene polymers and mixtures thereof.

5. The pneumatic tire of claim 4 wherein, said resin is a coumarone-indene resin.

6. The pneumatic tire of claim 1 wherein said resin is a phenol/acetylene resin.

7. The pneumatic tire of claim 1 wherein said resin is a rosin-derived resin.

8. The pneumatic tire of claim 1 wherein said tread contains from 10 to 250 phr of particulate silica.

9. The pneumatic tire of claim 8 wherein in said tread the silica is characterized by having a BET surface area in a range of from 40 to 600 square meters per gram and a dibutyl phthalate (DBP) absorption value in a range of from 100 to 400.

10. The pneumatic tire of claim 1 comprising (a) 50 to 90 phr of a rubber which, in its uncured states has a glass transition temperature in the range of from −90° C. to −105° C. and (b) 10 to 50 phr of at least one rubber which, in its uncured state, has a glass transition temperature in the range of from −50° C. to +10° C.

* * * * *